United States Patent Office.

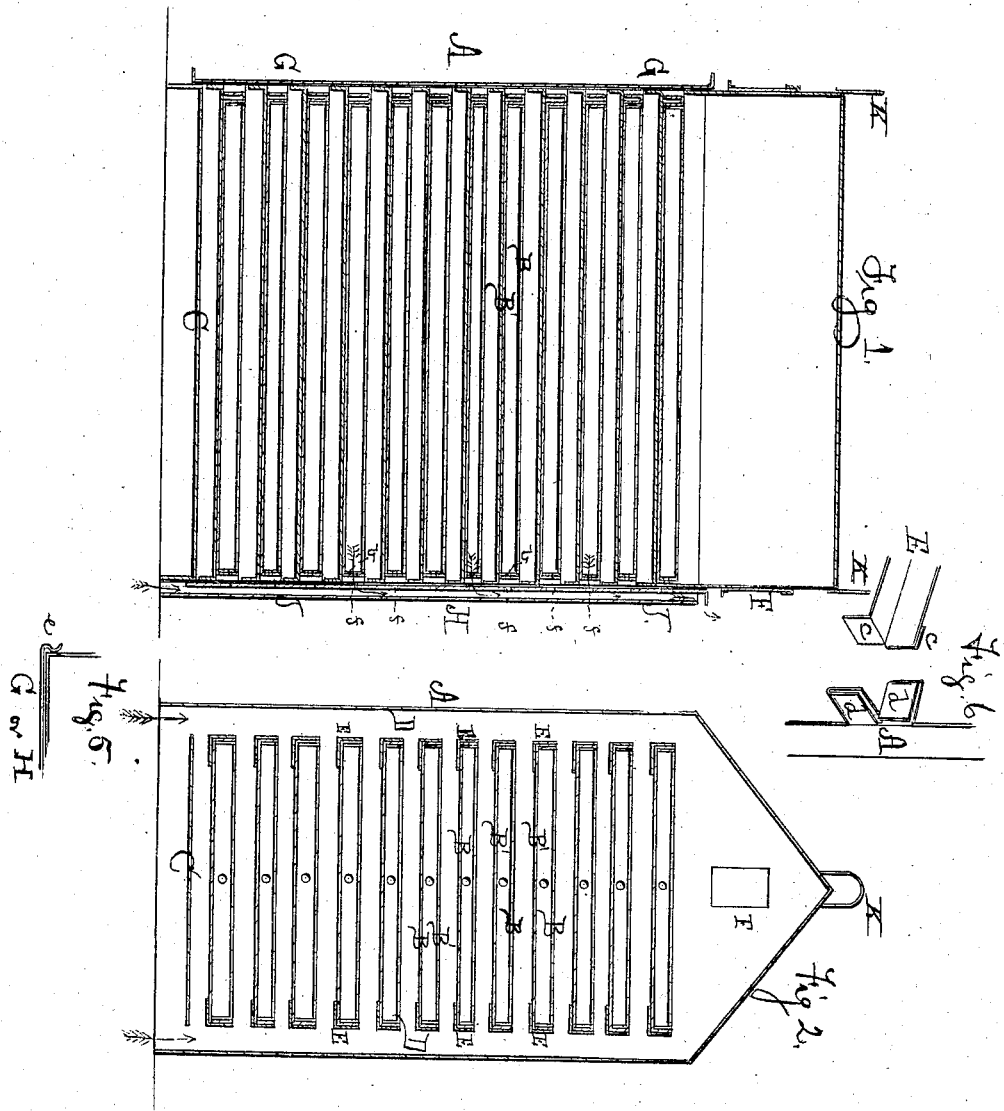

PETER MICKEL, OF MILFORD, NEW YORK.

Letters Patent No. 104,333, dated June 14, 1870.

DRIER.

The Schedule referred to in these Letters Patent and making part of the same.

*To all whom it may concern:*

Be it known that I, PETER MICKEL, of Milford, in the county of Otsego and State of New York, have invented new and useful Improvements in Driers; and I do hereby declare the following to be a full, clear, and exact description thereof, sufficient to enable others skilled in the art to which my invention appertains to make and use the same, reference being had to the accompanying drawing making part of this specification, in which—

Figure 1 is a central vertical longitudinal section of the device illustrating my invention.

Figure 2 is a transverse view thereof.

Figures 3, 4, 5, and 6 are views of detached parts.

My invention is a novel device for drying fruit, vegetables, herbs, &c., and is adapted to be placed on the top of a stove, furnace, or other similar heating apparatus. In general construction, it consists of a chamber, closed at the top and open at bottom, and within it is formed a series of ledges, intended to support a corresponding series of pans or trays, on which the article to be dried is placed, and with such other matter of detail as will be hereinafter more fully described.

In the drawing—

A represents the casing of the drier, constructed of any suitable material, and of any size or shape, as will be found most useful or necessary.

This casing is closed at its top, and open at bottom; and within said casing is hung a series of pans or trays, B B', and at or near the bottom is secured a deflecting-plate, C, which, with the trays B B', is made of a size less than the width of the casing, so as to leave a space, D, on each side of the casing.

The trays B B' are best shown in figs. 3 and 4. The part B consists of a flanged plate, in the form of a pan, and may have an extension, *a*, at one end, which shall constitute a handle, and a spring and an opening, *b*, in the other end, for purposes to be hereafter explained.

B' represents a secondary tray. It consists of a frame, C', of form corresponding with tray B', and a piece of suitable cloth, D', is stretched across the frame, and the two together are laid into the tray B'.

The two-part trays or pans are supported upon ledges or shelves E, which extend longitudinally from end to end of the casing, and are constructed and secured in place in the following manner:

They are made in the form of angle-iron, and their ends are bent downward and backward, as at *c c*, and adapted to interlock with the ends of the casing, which are cut out to form lips *d d*, which are bent inwardly at or about right angles to each other, as seen in fig. 6.

It is apparent that the locking-joint between the ledges and the casing form a strong mode of connection, and dispenses with solder, which is objectionable in drying apparatus, owing to its tendency to flow, and thus release the ledges, and a consequent falling of the trays and the drying substances.

At or near the roof or gable-ends of the casing, I provide a regulator or damper, F, which is adapted to admit fresh air, and to regulate and allow the escape of heated air.

G represents a door, which is hung at one end of the casing, and is intended to open and close said end. It is formed with a bent flange or lip, *e*, (see fig. 5,) which embraces the side of the casing opposite to the hinge, and forms a means for holding the door closed in position without the aid of catches or other fastenings.

A door, H, is hung to the end of the casing opposite to door G, and is provided with a series of openings, *f f*, each of which is located to occupy a position in line with the opening *b* in the end of the tray.

A flue, J, open at top and bottom, is secured to the outside of the door H, over the openings *f f*, and extends from the bottom of the casing to about the top of the door, the object of which will presently be explained.

A snap or flange, *e*, similar to the one on door G, is formed on door H, both for similar purposes.

I design to connect the pieces of the casing constituting the body proper and the roof by locking-joints, so as to dispense with solder, for the purpose hereinbefore described in the construction of the ledges or shelves E; yet I do not limit my invention to such feature.

Handles, K, should be conveniently placed, to admit of the ready movement of the drier to, on, and from the place of heating.

The operation is as follows:

The substances to be dried are placed on the trays. If they are of a nature to run or drip, it is desirable to place them directly on the trays B; but, if they are of a nature which will dry quickly, and are liable to burn, they should be placed on the cloth of the secondary frame, whereby the heated metal of tray B will scarcely come in contact with said substances. When the trays are filled to satisfaction, they are slid into the casing, with the ends which have the openings *b* toward the door H. Both doors are now closed, and the extension *a* of the trays B, acting as springs, will hold the trays in positions, and, by means of the snaps or flanges on the ends of the doors, tight joints are formed between the various parts. The drier is now placed on the stove or other heating apparatus, and the operation of drying will now commence. The heat which rises enters the chambers, and is diffused equally throughout its entire extent over the substances to be dried, and gradually and uniformly drying them.

The amount of heat may be regulated by the damper

F, either to confine it entirely until the drying is completed, in cases of quick drying, or allow its partial escape, as may be necessary.

A quantity of heat from the stove will pass up flue J, and cause a draught therein.

The vapor or steam which arises from the drying substances will pass off through the openings b in the trays into openings f of the door H, and out through the flue J.

For cooling the dried substances, I may remove the drier from the stove, draw out the trays, or allow them to remain in place, and open the doors G and H, or proceed in any manner which will properly accomplish the result.

If flies, bees, &c., are likely to settle on the substances, the latter may be covered and protected in any suitable manner.

The deflecting-plate C at the bottom of the casing prevents the heat from quickly reaching the lowermost tray, whereby the substances thereon will not dry more rapidly than those on the upper trays.

It will be seen that door H could be made a stationary plate, and provided with the openings f and flue J, as aforesaid, but the result will be the same as has been described.

The various matters of detail may be somewhat varied without departing from my invention.

Having thus described my invention,

What I claim as new, and desire to secure by Letters Patent, is—

1. The openings $ff$, formed in the flue J, in combination with the trays B B, supported upon the ledges E E of the casing A, provided with the spaces D on its sides, and a deflecting-plate, arranged above the open bottom, and below the trays, for the purpose specified.

2. The two-part trays B B', substantially as and for the purpose described.

3. The tray B, formed with an extension, a, at one end, and an opening, b, at the other end, substantially as and for the purpose described.

4. The flue J and openings $ff$, in combination with the trays, substantially as and for the purpose described.

5. The ledges E and casing, locked together as at c d, substantially as and for the purpose described.

The above signed by me this 26th day of March, 1870.

PETER MICKEL.

Witnesses:
 JOHN A. WIEDERSHEIM,
 JAMES L. NORRIS.